Oct. 11, 1949.        E. PEARSON        2,484,244

MOTOR CONTROL RELAY

Filed Oct. 7, 1946

WITNESSES:
E. A. M'Claskey
Nw. C. Goodwin

INVENTOR
Edward Pearson.
BY F. P. Lyle
ATTORNEY though the current taken by the motor is consider-

UNITED STATES PATENT OFFICE 2,484,244

MOTOR CONTROL RELAY

Edward Pearson, Bradford, England, assignor to The English Electric Company, Limited, London, England, a company of Great Britain Application October 7, 1946, Serial No. 701,727
In Great Britain October 22, 1945

3 Claims. (Cl. 200—88)

The present invention relates to single-phase alternating-current electric motors, and more particularly to means for controlling the starting windings of single-phase induction motors, and for protecting such motors against overloads or other abnormal conditions.

Single-phase induction motors have a main or running primary winding and an auxiliary or starting primary winding, which are physically displaced from each other on the stator of the motor, and which carry currents which are displaced in phase. In starting such a motor, the two primary windings are connected in parallel to a single-phase supply line, and a starting torque is developed because of the phase displacement between the currents in the two windings. When the motor has accelerated to a sufficiently high speed, the auxiliary winding is disconnected, and the motor continues to run on the main winding alone. Centrifugal switches are often used for the purpose of disconnecting the auxiliary winding at a predetermined speed, but there are many applications of single-phase motors in which the use of centrifugal switches is undesirable, or is not permissible, and in such cases external relays responsive to the motor current are usually utilized for controlling the auxiliary primary winding. It is desirable to make such devices as simple and as compact as possible so that they will be reliable in operation and will take up as little space as possible. It is also usually desirable to provide means for protecting the motor against overloads, or other abnormal conditions which cause overheating of the motor.

The principal object of the present invention is to provide a single-phase induction motor which has a simple electromagnetic means for controlling the auxiliary or starting primary winding in response to the motor current.

A further object of the invention is to provide a single-phase induction motor having a simple electromagnetic means for controlling the auxiliary primary winding, and also having means for protecting the motor against overloads or other abnormal conditions.

Another object of the invention is to provide a simple and compact control device for controlling the circuit of the auxiliary primary winding of a single-phase induction motor in response to the motor current.

A still further object of the invention is to provide a simple and compact electromagnetic control device for controlling the auxiliary primary winding of a single-phase induction motor, and which also includes thermally-responsive means for protecting the motor against overloads, or other abnormal conditions.

Other objects and advantages of the invention will be apparent from the following detailed description, taken in connection with the accompanying drawing, in which.

Figure 1:
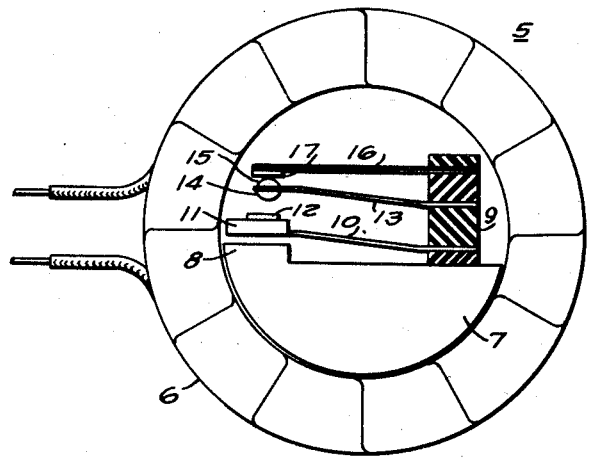
Figure 1 is a plan view of a control device or relay embodying the invention.

Referring first to Fig. 1 of the drawing, the electromagnetic control device or relay 5 of the present invention has an operating coil 6, which may be quite short in the axial direction, and which has a relatively large internal diameter as compared to its axial length. A core member 7, which may be made of soft iron or other suitable magnetizable material, is placed within the coil 6. In the preferred embodiment shown in Fig. 1, the core 7 is segmental in shape, so as to fit snugly within the coil 6 at one side of the diameter and the core has a projecting portion 8 at one end forming a pole piece. A support and terminal block 9 of insulating material is secured to the core 7 at the opposite end from the pole piece 8. A spring member 10 of any suitable resilient conducting material such as steel, is secured in the insulating support 9, and a movable armature member 11 of soft iron, or other magnetizable material, is mounted on the spring member 10 opposite the pole piece 8. The pole piece 8 and the movable armature 11 have opposed parallel surfaces which are substantially parallel to the axis of the coil 6. It will be apparent, therefore, that when the coil is energized, the opposed surfaces of the pole piece 8 and armature 11 extend parallel to the direction of the magnetic field of the coil, and the pole piece and armature will be magnetized in such a manner that a repulsive force exists between them which tends to move the armature 11 away from the core 7. This movement is resiliently opposed by the spring member 10, which urges the armature toward the core.

A contact 12 is carried on the movable armature 11. A second conducting spring support member 13 is mounted in the insulating support 9, and carries a contact 14 in position to be engaged by the contact 12 when the armature 11 moves away from the core 7. A second contact 15 is also carried on the spring support 13, on the opposite side from the contact 14, the two contacts being electrically connected by the spring support. A bimetallic strip or element 16 is supported in the insulating block 9, and its free end carries a contact 17 which normally engages the contact 15 on the spring support 13. Terminal means of any suitable type may be provided for connecting electrical leads to the fixed ends of the spring 10, spring 13, and bimetallic strip 16. The entire relay 5 is preferably enclosed in a housing or case of any suitable type, which may be made of magnetic material to protect the relay from the influence of external magnetic fields and to strengthen the field of the coil 6.

Figure 2:
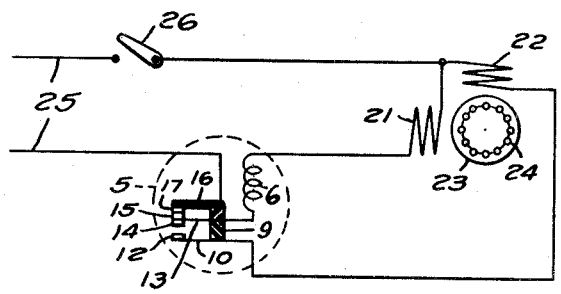
Fig. 2 is a schematic wiring diagram showing the electrical connections of a single-phase motor utilizing the control device of Fig. 1.

Fig. 2 shows the manner in which the relay 5 is connected to control a single-phase induction motor 20 of the split-phase type. The motor 20 is shown as having a main or running primary winding 21, and an auxiliary or starting primary winding 22, which are disposed on the stator of the motor approximately ninety electrical degrees apart, and which are designed so that their currents are displaced in phase. The motor 20 has a rotor member 23 of any suitable type, which carries a squirrel-cage secondary winding 24. It will be understood that although a motor of the split-phase type has been shown, in which the phase displacement of the primary winding currents is produced by the design of the windings, the invention is also applicable to other types of single-phase motors, such as the capacitor-start motor, in which the phase displacement is produced by a capacitor connected in series with the auxiliary winding.

One end of the main winding 21 and one end of the auxiliary winding 22 are connected together and to one side of a single-phase supply line 25 through a line switch 26. The other end of the main winding 21 is connected to the coil 6 of the relay 5, and the other end of the coil 6 is connected to the spring support 13. The bimetallic element 16 is connected to the other side of the line 25, so that the bimetallic element 16 and coil 6 are in series with the main winding 21. The free end of the auxiliary winding 22 is connected to the spring member 10.

In the normal position of the relay 5, the contacts 12 and 14 are separated and the contacts 15 and 17 are engaged, as shown in the drawing. When the line switch 26 is closed, to start the motor 20, the main winding 21 is connected across the line in series with the coil 6 and bimetal element 16. The heavy in-rush current to the winding 21 energizes the coil 6, and produces a strong magnetic field passing through the core 7 and armature 11. As explained above, these members are positioned in the magnetic field in such a manner that a repulsive force exists between them, and the initial in-rush current, when the winding 21 is connected to the line, energizes the coil 6 so strongly that the repulsive force between the armature 11 and pole piece 8 is great enough to cause the armature to move away from the core, against the opposing force of the spring 10, so that the contact 12 engages the contact 14. Engagement of these contacts connects the auxiliary winding 22 to the line and the motor starts. As the motor accelerates towards its normal speed, the current decreases, thus weakening the magnetic field of the coil 6. When the motor reaches a predetermined speed, the current in the coil has decreased to such an extent that the repulsive force between the armature 11 and the core 7 is no longer great enough to overcome the opposing force of the spring 10, and the spring separates the contacts 12 and 14, disconnecting the auxiliary winding 22 from the line. The motor then continues to run in the normal manner on the main winding 21 alone.

As indicated above, the bimetallic element 16 is in series with the main winding 21 and carries the motor current, so that it is heated by the current passing through it. Under normal conditions the contacts 15 and 17 are in engagement, and the normal motor current does not heat the bimetallic element sufficiently to cause it to separate the contacts. In case of an overload, or other abnormal condition causing an excessive motor current, the increased heating effect of the current raises the temperature of the bimetallic element 16, and when its temperature exceeds a predetermined value, it flexes upward, as viewed in the drawing, and separates the contacts 15 and 17, thus disconnecting the motor from the line and protecting it from the harmful effects of overheating. If the relay 5 is mounted on the motor 20 so that the bimetallic element 16 is also subjected to direct heating by the motor, complete protection is afforded against any abnormal condition which may cause overheating, since the excessive heating will cause the bimetallic element to open the contacts 15 and 17 even though the abnormal condition may not cause excessive line current.

It will be apparent, therefore, that a simple and compact control device, or relay, has been provided for controlling the auxiliary winding of a single-phase induction motor, and for protecting the motor against overloads, or other abnormal conditions. The relay may be mounted at any point remote from the motor and requires very little space, as it can be made quite small. In many cases, however, it is desirable to mount the relay directly on the motor so as to obtain complete protection, as explained above, and the relay can readily be mounted on the motor because of its small size. The arrangement of the contacts and bimetallic element within the coil 6 of the relay results in a very compact construction and also has the advantage of reducing, or substantially eliminating, sparking or arcing at the contacts, since the circuit is interrupted in the magnetic field of the coil. Excessive vibration of the contacts may readily be prevented, if necessary, by means of eddy current damping, by providing a short-circuited winding, or a block of low-resistance material such as copper, on the armature 11. Various other changes and modifications may also be made within the scope of the invention. Thus, as is well known in the art, the bimetallic element 16 may be heated indirectly by an auxiliary heater carrying part or all of the motor current, instead of being heated directly by the current.

Figure 3:
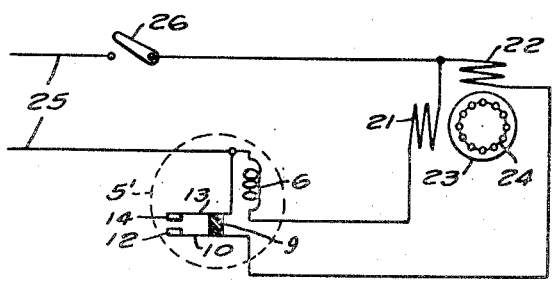
Fig. 3 is a schematic wiring diagram showing a modified embodiment of the invention.

Fig. 3 shows a modified embodiment of the invention which may be utilized when the protective feature is not required, and the relay is to be used only to control the circuit of the auxiliary winding of the motor. The relay 5' shown in Fig. 3 is identical with the relay 5 described above, except that the bimetallic element 16 is omitted. In this embodiment of the invention, the coil 6 is connected directly in series between the main winding 21 and the supply line 25. The auxiliary winding 22 is connected as before to the spring member 10, and the spring support 13 is connected directly to the line 25. In operation, the motor is started by closing the line switch 26, and the action of the relay 5' to close the contacts 12 and 14, and thus connect the winding 22 to the line, is exactly as previously described. As the motor accelerates, the line current decreases, and when the motor has reached a predetermined speed, the spring 10 separates the contacts 12 and 14 to disconnect the auxiliary winding 22, as described above. Thus the operation of this embodiment of the invention is identical to that previously described except for the omission of the thermally-responsive protective means.

It will be obvious that although certain preferred embodiments of the invention have been shown and described for the purpose of illustration, various changes may be made within the scope of the invention, and it is to be understood, therefore, that the invention is not limited to the specific details shown and described, but in its broadest aspects it includes all equivalent embodiments and modifications which come within the scope of the appended claims.

I claim as my invention:

1. A control device for a single-phase induction motor, said control device comprising a coil adapted to carry the motor current, a generally segmental magnetizable core member disposed entirely within the coil, a movable armature member, a spring member mounted on the core member for supporting the armature member entirely within the coil adjacent said core member, said armature member and core member having opposed surfaces which are substantially parallel to the axis of the coil, whereby a repulsive force exists between them when the coil is energized, said spring member opposing movement of the armature member away from the core member, a movable contact carried by the armature member within the coil, a support member mounted on the core within the coil, and a relatively fixed contact carried on said support member within the coil and disposed to be engaged by the movable contact when the armature member moves away from the core member.

2. A control device for a single-phase induction motor, said control device comprising a coil adapted to carry the motor current, a generally segmental magnetizable core member disposed entirely within the coil, a movable armature member, a spring member mounted on the core member for supporting the armature member within the coil adjacent said core member, said armature member and core member having opposed surfaces which are substantially parallel to the axis of the coil, whereby a repulsive force exists between them when the coil is energized, said spring member opposing movement of the armature member away from the core member, a movable contact carried by the armature member, a support member mounted on the core member adjacent the spring member, a second contact carried by said support member in position to be engaged by the movable contact when the armature member moves away from the core member, other contact means electrically connected in series with the second contact, and thermally-responsive means mounted on the core member within the coil for actuating said other contact means in response to heating above a predetermined temperature.

3. A control device for a single-phase induction motor, said control device comprising a coil adapted to carry the motor current, a magnetizable core member disposed within the coil, a movable armature member, a spring member for supporting the armature member within the coil adjacent said core member, said armature member and core member having opposed surfaces which are substantially parallel to the axis of the coil, whereby a repulsive force exists between them when the coil is energized, said spring member opposing movement of the armature member away from the core member, a movable contact carried by the armature member, a support member disposed adjacent the spring member, a second contact carried by said support member in position to be engaged by the movable contact when the armature member moves away from the core member, a third contact carried by the support member and electrically connected to the fixed contact, a bimetallic element disposed within the coil, and a fourth contact carried by said bimetallic element and normally engaging the third contact, the bimetallic element being adapted to move the fourth contact away from the third contact in response to heating above a predetermined temperature.

EDWARD PEARSON.

REFERENCES CITED

The following references are of record in the file of this patent:

UNITED STATES PATENTS

| Number | Name | Date |
|---|---|---|
| 1,674,757 | Bates | June 26, 1928 |
| 2,207,422 | Vaughan et al. | July 9, 1940 |
| 2,264,022 | Ellwood | Nov. 25, 1941 |
| 2,275,531 | Lakatos | Mar. 10, 1942 |
| 2,311,048 | Harrold | Feb. 16, 1943 |
| 2,320,252 | Vaughan | May 25, 1943 |
| 2,323,266 | Wilson | June 29, 1943 |
| 2,338,731 | Morse | Jan. 11, 1944 |
| 2,425,668 | Bolesky et al. | Aug. 12, 1947 |